United States Patent Office 3,218,293
Patented Nov. 16, 1965.

3,218,293
POLYPROPYLENE STABILIZED WITH A COMBINATION OF NICKEL AND COBALT DITHIOCARBAMATES
William F. Geigle, Springfield, Pa., assignor to Sun Oil Company, Philadelphia, Pa., a corporation of New Jersey
No Drawing. Filed Dec. 2, 1960, Ser. No. 73,171
10 Claims. (Cl. 260—45.75)

This invention relates to the stabilization of solid, substantially crystalline, isotactic polypropylene, and more particularly to new compositions of matter comprising such a solid polymer of relatively high molecular weight and a synergistic stabilizer composition therefor.

Solid, substantially crystalline, isotactic polypropylene can be prepared by the polymerization of propylene using a solid catalytic material. A catalyst system which is especially effective for such a polymerization is the combination of a halide of titanium, such as titanium trichloride, and an aluminum trialkyl, such as aluminum triethyl. In a typical procedure, the catalyst is prepared by admixing, for example, titanium tetrachloride and aluminum triethyl in an inert solvent, such as isooctane, to produce a reaction product which acts as a catalyst for polymerizing the propylene to solid polymers. On the other hand, a lower halide, such as titanium trichloride, can be preformed, dispersed in an inert liquid, and an activator, such as an aluminum trialkyl, added. In performing the polymerization step, the monomer is contacted with the solid catalyst, such as by passing the propylene into the liquid reaction mixture and it is thereby polymerized to solid polymers. Anhydrous and oxygen-free conditions are used throughout the process, since the catalyst is deactivated by contact with water or oxygen. Other specific catalyst systems, i.e., other metal halide or metal oxide catalyst systems, as well as the other process conditions, necessary for the preparation of the polypropylene described herein are illustrated by pages 350 through 361, pages 416 through 419, pages 452 and 453 of "Linear and Stereoregular Addition Polymers" by Norman G. Gaylord and Herman F. Mark, Interscience Publishers, 1959, the contents of which are incorporated herein by reference.

Polypropylene prepared by the process described above has a melting point of from 160° C. to 175° C., a tensile strength of from 3,000 to 6,000 p.s.i. (pounds per square inch), and a molecular weight of from 50,000 to 850,000 or more (light-scattering). Usually a mixture of crystalline and amorphous polymers is obtained. If desired, the amorphous polymer can be separated from the crystalline polymer which is isotactic in nature by contacting a mixture thereof with a hydrocarbon solvent, such as isooctane or n-heptane, at an elevated temperature. The amorphous polymer is substantially soluble under these conditions, whereas the crystalline polymer is substantially insoluble. The compositions of the present invention are prepared from either crystalline, or mixtures of crystalline with amorphous, polymers in which the mixture contains at least 25%, and preferably at least 50%, by weight of the crystalline polymer.

Such polymers may be molded or otherwise fabricated to form many useful articles. However, the above-described polypropylene is susceptible to degradation caused by exposure to light, particularly severe degradation thereof taking place when it is exposed to light in the ultra-violet portion of the spectrum. This degradation apparently results from free-radical formation, which formation is promoted by ultra-violet light and impurities such as metals and metal compounds. The free-radicals which are formed undergo further chemical reactions, resulting in undesirable chemical and physical transformations. Thus polypropylene deteriorates prematurely, loses tensile strength, molecular weight and other desirable properties, such as pliability and impact strength, and becomes discolored and embrittled.

An object of the present invention is to provide compositions comprising substantially crystalline, isotactic, solid polypropylene containing a minor quantity of a synergistic composition effective to stabilize the polymer against degradation. It is a specific object of this invention to provide compositions comprising the above-described polypropylene containing minor quantities of a synergistic stabilizing composition effective to substantially prevent degradation of the polymer caused by exposure to light, particularly the ultra-violet portion of the spectrum. It is a further object to provide a method for so stabilizing polypropylene.

According to one embodiment of the present invention, it has been found that remarkably stable polypropylene compositions may be prepared by admixing with the substantially crystalline, solid, isotactic polymer a stabilizing quantity of a synergistic stabilizing composition comprising a mixture of dithiocarbamates. One of these mixed dithiocarbamates has the general formula:

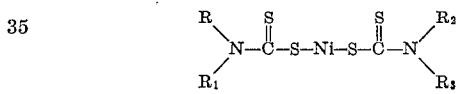

wherein each of R, $R_1$, $R_2$, and $R_3$ is a hydrocarbon radical having from 1 to about 18 carbon atoms. The hydrocarbon radicals may be the same or different alkyl, aralkyl, aryl, or cycloalkyl groups. For example, suitable compounds for use as a stabilizing ingredient of the compositions of this invention include: nickel dipropyldithiocarbamate, nickel dibutyldithiocarbamate, nickel dihexyldithiocarbamate, nickel dioctyldithiocarbamate, nickel diauryldithiocarbamate, nickel distearyldithiocarbamate, nickel dibenzyldithiocarbamate, nickel dicyclohexyldithiocarbamate, nickel dicyclopentyldithiocarbamate, nickel diphenyldithiocarbamate, nickel dinaphthyldithiocarbamate, and the like.

The other one of these dithiocarbamates comprising the synergistic mixture of this invention has the general formula:

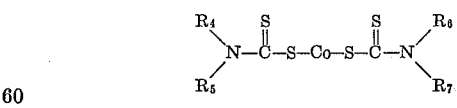

wherein each of $R_4$, $R_5$, $R_6$, and $R_7$ is a hydrocarbon radical having from 1 to about 18 carbon atoms. The hydrocarbon radicals may be the same or different alkyl, aralkyl, aryl, or cycloalkyl groups. For example, suitable compounds for use as a stabilizing ingredient of the compositions of this invention include: cobalt dipropyldithiocarbamate, cobalt dibutyldithiocarbamate, cobalt dihexyldithiocarbamate, cobalt dioctyldithiocarbamate, cobalt dilauryldithiocarbamate, cobalt distearyldithiocarbamate, cobalt dibenzyldithiocarbamate, cobalt dicyclohexyldithiocarbamate, cobalt dicyclopentyldithiocarbamate, cobalt diphenyldithiocarbamate, cobalt dinaphthyldithiocarbamate and the like.

The use of a stabilizing quantity, e.g., from about 0.005% to about 5% by weight, preferably about 0.1% to about 2.0% by weight, of each of the stabilizing ingredients of this invention in combination with the polypropylene described herein imparts remarkable stability thereto against degradation caused by exposure to light, particularly that portion of the spectrum which includes ultra-violet light. Numerous stabilizers have been disclosed in the prior art for arresting degradation of other olefin polymers. However, it has been found that virtually none of them are useful in the polypropylene of this invention; see page 192, volume 37, No. 5 of "Modern Plastics," January 1960. It appears clear then that the mechanism by which the olefin polymers known heretofore degrade is entirely different from the mechanism by which polypropylene degrades. Accordingly, the mechanism by which polypropylene is stabilized is unrelated to that by which other olefin polymers are stabilized.

The stabilizing ingredients may be combined with the polypropylene by any method suitable for the preparation of homogeneous mixtures. For example, the polymer may be melted and the additives admixed therewith by milling on heated rolls, or by using a Banbury mixer. Alternatively, the additives may be combined, in a solid or molten state, with a solution or suspension of the polymer in a suitable liquid. In another process, one dissolves the stabilizing ingredients in a suitable solvent, admixes powdered polymer therewith, and evaporates the solvent. In another mode of operation, the solid stabilizing ingredients are thoroughly dry-mixed with the solid polymer. In general, it is preferable that the mixing process be carried out in the substantial absence of oxygen, e.g., in an inert atmosphere or under vacuum, in order to prevent oxidation of the polymer.

Since non-stabilized polypropylene is normally drastically degraded when exposed to ultra-violet and visible light, particularly the high ultra-violet and the low visible light, the extent of this degradation is one criterion useful for illustrating the effectiveness of the synergistic stabilizing composition of this invention. One method of determining the extent of this degradation involves the use of the Carbon-Arc Lamp Test in the Atlas Fade-Ometer substantially in the manner described in Standard Test Method 16A-1957 of the American Association of Textile Chemists and Colorists. According to this test, yarns (multifilaments) or monofilaments under tension are exposed to the light produced by a carbon arc. Every 20 hours the filaments are examined to determine whether or not the filaments are broken; if so, the test is terminated; if not, the test is continued until breakage occurs. Meanwhile, at 60 hour intervals, the filaments are tested on an Instron Tensile Tester and compared with unexposed filaments. In the illustrative examples given below, the filaments (i.e., mono- or multifilaments) are wound on standard black-faced "mirror" cards (6½ by 9⅓ inches) and secured thereto at the margins with cellophane tape. Winding thereof is performed using a Universal winding device at a tension of 0.75 g., and when so-wound, each card contains 3 groups of filaments having 5 to 8 monofilaments or multifilaments in each group.

The following examples are given by way of illustration and not by way of limitation, the scope of the invention being determined by the appended claims.

EXAMPLES 1-5

Polypropylene monofilaments were exposed in the Atlas Fade-Ometer in the manner described above giving the results tabulated below. In Table I, A designates nickel dibutyldithiocarbamate and B designates cobalt dibutyldithiocarbamate.

*Table I*

| Examples | 1 | 2 | 3 | 4 | 5 |
|---|---|---|---|---|---|
| A, percent by wt | 0.5 | 1.0 | 0.5 | | |
| B, percent by wt | | | 0.5 | 1.0 | 0.5 |
| Denier | 142 | 133 | 166 | 174 | 99 |

| Hours in Fade-Ometer: | Percent Retained Tenacity | | | | |
|---|---|---|---|---|---|
| 60 | 100 | 102 | 106 | 103 | 105 |
| 120 | 96 | 99 | 115 | 105 | 99 |
| 180 | 97 | 96 | | | |
| 200 | | | 115 | 103 | 96.5 |
| 240 | 101 | 112 | | | |
| 300 | 71 | 102 | 111 | 92 | 55.8 |
| 360 | | | | | ¹ 320 |
| 420 | (¹) | | | | |
| 480 | | | | | |
| 500 | | | 94 | 61.5 | |
| 540 | | | | | |
| 600 | | 89 | | | |
| 660 | | | | | |
| 720 | | ¹ 740 | | ¹ 760 | |
| 780 | | | | | |
| 840 | | | | | |
| 900 | | | | | |
| 960 | | | | | |
| 1,000 | | | | 89 | |
| 1,020 | | | (¹) | | |

¹ Broken.

The foregoing data show that the combination of the pair of dithiocarbamates is considerably more effective as a stabilizer than the sum of the stabilizing affects of its parts. Moreover, these data show that this combination is more effective at a given concentration than twice that amount of either of these materials individually. On the other hand, non-stabilized polypropylene failed between 20 and 40 hours in the Fade-Ometer.

EXAMPLES 6-10

Example 3 is repeated substituting dithiocarbamates having the formula:

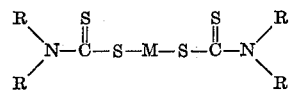

wherein M and R are the metals and radicals, respectively, defined in Table II.

*Table II*

| Examples | R | M |
|---|---|---|
| 6 | A: n-propyl | A: nickel. |
|  | B: n-propyl | B: cobalt. |
| 7 | A: n-hexyl | A: nickel. |
|  | B: n-hexyl | B: cobalt. |
| 8 | A: 2-ethyl-hexyl | A: nickel. |
|  | B: 2-ethyl-hexyl | B: cobalt. |
| 9 | A: cyclohexyl | A: nickel. |
|  | B: cyclohexyl | B: cobalt. |
| 10 | A: lauryl | A: nickel. |
|  | B: lauryl | B: cobalt. |

No broken filaments are observed after 800 hours in the Fade-Ometer.

EXAMPLES 11-16

The procedure of Examples 1-5 was repeated resulting in the data tabulated in Table III.

Table III

| Examples | 11 | 12 | 13 | 14 | 15 | 16 |
|---|---|---|---|---|---|---|
| A, percent by wt | 0.5 | 0.20 | 0.25 | 0.30 | | |
| B, percent by wt | | | 0.25 | | 0.5 | 0.25 |
| Denier | 142 | 141 | 97 | 139 | 168 | 181 |
| | Percent Retained Tenacity | | | | | |
| Hours in Fade-Ometer: | | | | | | |
| 60 | 100 | 102 | 103 | 103 | 105 | 102 |
| 120 | 96 | 94 | 100 | 103 | 99 | 110 |
| 180 | 97 | Broken | | 98 | | (1) |
| 200 | | | 95 | Broken | 96.5 | |
| 240 | 101 | | | | | |
| 300 | 71 | | 90 | | 55.8 | |
| 320 | | | | | Broken | |
| 400 | | | | | | |
| 420 | Broken | | | | | |
| 500 | | | 80 | | | |
| 600 | | | | | | |
| 680 | | | Broken | | | |

[1] Broken at 160.

The invention claimed is:

1. A light-stable composition comprising solid, substantially crystalline, isotactic polypropylene and a stabilizing quantity comprising from about 0.005% to about 5% by weight of each of (1) a substance having the formula:

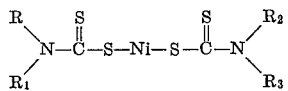

and (2) a substance having the formula:

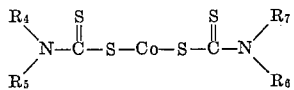

wherein each of R, $R_1$, $R_2$, $R_3$, $R_4$, $R_5$, $R_6$, and $R_7$ is an alkyl group containing 1 to about 18 carbon atoms.

2. The composition of claim 1 wherein said stabilizing quantity is from about 0.1% to about 2% by weight of said composition.

3. The composition of claim 2 wherein one of said substances is nickel-di-2-ethylhexyldithiocarbamate.

4. The composition of claim 2 wherein one of said substances is cobalt di-2-ethylhexyldithiocarbamate.

5. The composition of claim 2 wherein one of said substances is nickel di-n-hexyldithiocarbamate.

6. The composition of claim 2 wherein one of said substances is cobalt di-n-hexyldithiocarbamate.

7. The composition of claim 2 wherein one of said substances is nickel dilauryldithiocarbamate.

8. The composition of claim 2 wherein one of said substances is cobalt dilauryldithiocarbamate.

9. A light-stable composition comprising solid, substantially crystalline, isotactic polypropylene and a stabilizing quantity comprising from about 0.005% to about 5% by weight of each of nickel di-n-butyl dithiocarbamate and cobalt di-n-butyl dithiocarbamate, the total quantity of said dithiocarbamates being a synergistic stabilizing quantity.

10. The composition of claim 9 wherein said stabilizing quantity is from about 0.1% to about 2% by weight of said composition.

References Cited by the Examiner

UNITED STATES PATENTS

| | | | |
|---|---|---|---|
| 2,739,122 | 3/1956 | Kennerly et al. | 260—45.75 |
| 2,868,745 | 1/1959 | Canarios | 260—45.85 |
| 2,889,295 | 6/1959 | Darby et al. | 260—45.85 |
| 2,947,721 | 8/1960 | Newland et al. | 260—45.95 XR |
| 2,964,495 | 12/1960 | Newland et al. | 260—45.75 |
| 2,972,596 | 2/1961 | Newland et al. | 260—45.75 |
| 3,001,969 | 9/1961 | Tholstrup et al. | 260—45.75 |

FOREIGN PATENTS 495,814  6/1954  Italy.

OTHER REFERENCES

Polypropylene, Kresser, Reinhold Publishing Corp., N.Y., 1960, pp. 41, 42.

LEON J. BERCOVITZ, *Primary Examiner.*

ALPHONSO D. SULLIVAN, *Examiner.*